United States Patent [19]

Thomas

[11] 3,820,028

[45] June 25, 1974

[54] DIGITAL TONE SIGNAL GENERATOR

[76] Inventor: James L. Thomas, 1520 Shasta Way, Placentia, Calif. 92670

[22] Filed: Apr. 9, 1973

[21] Appl. No.: 349,161

Related U.S. Application Data

[63] Continuation of Ser. No. 175,524, Aug. 27, 1971, abandoned.

[52] U.S. Cl. .................... 328/14, 307/261, 307/271

[51] Int. Cl. .............................................. H03k 1/16

[58] Field of Search ............... 307/261, 271; 328/14

[56] References Cited

UNITED STATES PATENTS

| | | | |
|---|---|---|---|
| 3,300,775 | 1/1967 | Dowling | 340/41 X |
| 3,500,213 | 3/1970 | Ameau | 328/14 |
| 3,568,069 | 3/1971 | Gabor | 328/14 |
| 3,579,117 | 5/1971 | Norris et al. | 328/14 X |

*Primary Examiner*—John Zazworsky
*Attorney, Agent, or Firm*—H. Fredrick Hamann; G. Donald Weber, Jr.

[57] ABSTRACT

Counter circuits respond to depressed switches to generate two digital counts equivalent to audio frequency signals represented by a depressed switch. Digital output signals generated from the counts comprise substantially the fundamental frequency components of the desired audio frequency signals. The outputs are summed and processed to a transmission line.

10 Claims, 2 Drawing Figures

INVENTOR
JAMES L. THOMAS

BY Robert G. Rogers
ATTORNEY

INVENTOR
JAMES L. THOMAS
BY Robert G. Rogers
ATTORNEY

DIGITAL TONE SIGNAL GENERATOR

This is a continuation of application Ser. No. 175,524 filed Aug. 27, 1971, and now abandoned.

BACKGROUND OF THE INVENTION

1. Field of the Invention

The invention relates to a digital tone generator and more particularly to such a generator in which inputs are converted into digital counts equivalent to audio frequency signals.

2. Discussion of Prior Art

A tone generator, for use in a telephone application, requires eight audio frequency signals. The name "Touch-Tone," commonly used to describe an audio signal generator for telephone applications, is a registered service mark of American Telephone and Telegraph. Various oscillator and filtering circuits have been proposed to generate the audio frequency signals. For example, see the article entitled "An Integrated RC Oscillator for Touch-Tone Dialing" by William H. Orr et al., IEEE Transactions on Communication Technology, Vol. Com–16, No. 4 Aug., 1968, pages 624 through 628 and the article entitled "Computer Tuning of Hybrid Audio Oscillators" by Frederick H. Hintzman, Jr., IEEE Spectrum, Feb., 1969, pages 56 through 60.

Generally, the eight audio frequency signals comprise four low frequency tones between the frequencies of 697 and 941 HZ and four high frequency tones between the frequencies of 1209 and 1633 HZ. When a push button of the subscriber or calling telephone set is depressed, a signal is generated comprising a low frequency and a high frequency tone. The composite signal represents the number or symbol on the button depressed.

It is believed that a digital system offers a simpler approach towards the generation of the audio frequency signals. A digital system can be easily implemented by integrated circuit techniques.

It would be expected that a digital system would generate signals having a high percentage of odd harmonics. In that case, complicated filtering and additional amplification circuitry might be required. However, in a preferred digital system, the signals are generated in which the odd harmonics are sufficiently removed from any of the fundamental frequency components of the audio frequency signals required. In addition, a telephone line is a relatively good bandpass filter, limiting the frequency of signals between 300 and 3,000 HZ. Therefore for a telephone system application, a certain amount of filtering is automatically achieved.

SUMMARY OF THE INVENTION

Briefly, the invention comprises a digital signal generating system in which digital counts representing relatively high and low frequency signals are produced in separate channels in response to input data. In one embodiment, the digital counts are represented by the states of counter stages in each of the channels. The counts control the frequency of input signals to shift registers for each channel to produce digital signals having substantially the fundamental components of the desired high and low frequency signals. The two digital signals are summed and processed to a transmission channel to represent the input data.

The digital counts representing the frequency signals occur cyclically until the digital signals are generated. The period of a counting cycle is a function of the input data. Once each cycle, when a count is logically detected, a shift signal is provided to the corresponding shift register for shifting each register through one cycle. Therefore, the frequencies (high and low) of the digital signal outputs from the shift registers are a function of the counting cycle. As a result, by controlling the counting cycle as a function of the input data, the fundamental frequency component of the high and low frequency signals can also be controlled. In other words, the width and therefore the frequency of the digital output signals are increased or decreased in response to the increases and decreases in the counting cycles of the counter circuits generating the digital counts.

In a telephone application, the input data is determined by the depression of a push button for controlling the generation of high and low frequency audio tones. First and second counter circuits are set to bit configurations (counts) representing a number or symbol on a depressed push button of a telephone dial. The counter outputs provide input pulses to shift registers which generate output voltage levels from each stage. Certain shift register bit configurations are inhibited so that digital signals approximating sine waves with the correct frequencies are generated. The output voltage levels are summed to form digital output signals each having pulse widths as a function of the counting cycles of the counters. The digital signals are summed and processed to a telephone line as equivalent audio tones.

Therefore, it is an object of this invention to provide a digital tone generator system in which digital output signals have a relatively high fundamental component.

Another object of this invention is to provide an improved audio frequency generator system using digital techniques which control the odd harmonics in a digital output signal comprising an audio frequency component representing input data.

Another object of this invention is to provide a two-channel digital signal generator system for high and low frequency signals in which digital counts produced in response to input data are equivalent to the signals representing the input data.

These and other objects of this invention will become more apparent when taken in connection with the description of the drawings, a brief description of which follows:

DESCRIPTION OF THE PREFERRED EMBODIMENT

Figure 1:
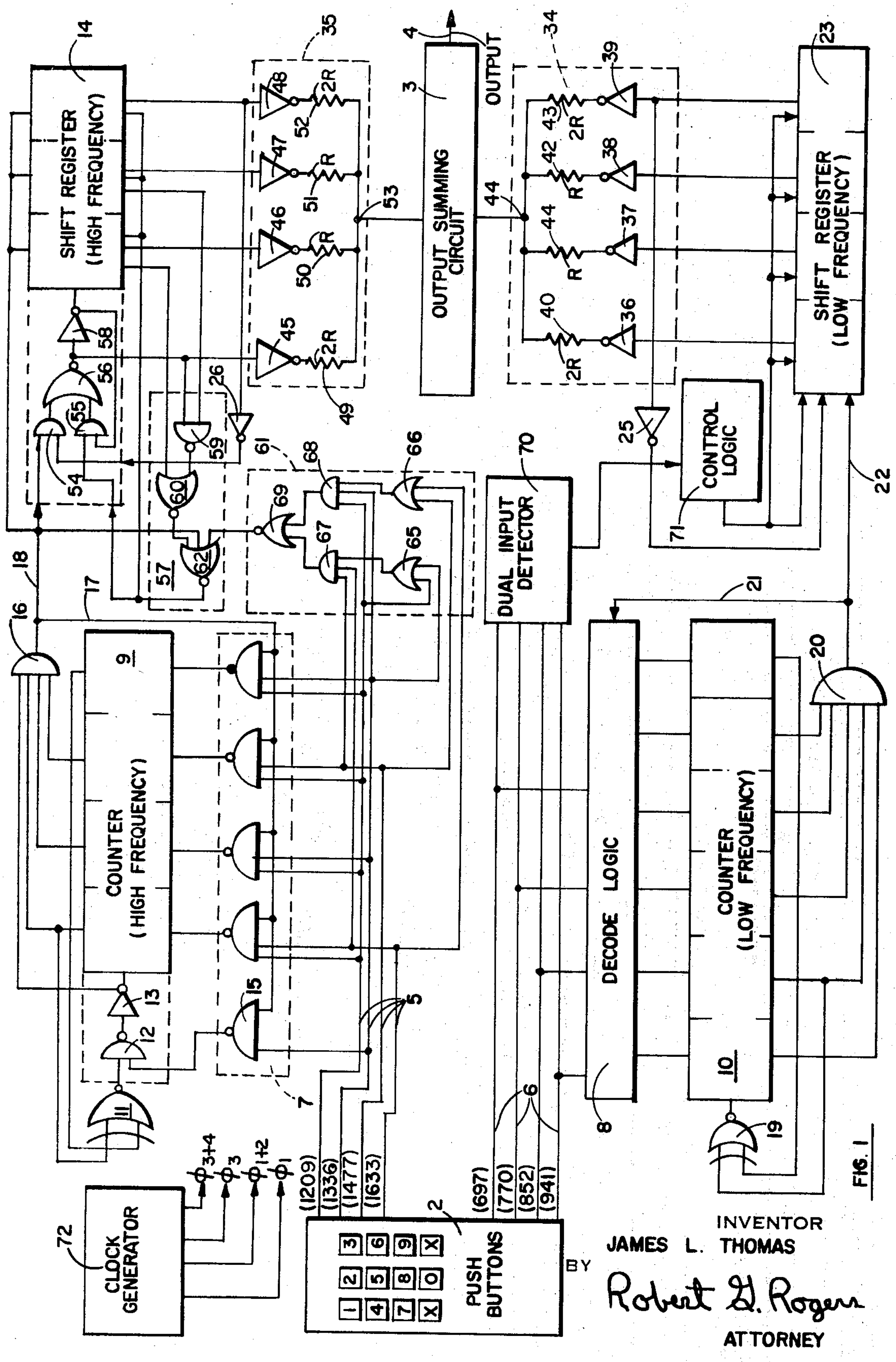
FIG. 1 is a partial block diagram, partial schematic drawing of one embodiment of the digital tone generator system.

FIG. 1 is a partial logic and partial schematic diagram of one embodiment of a digital tone generator 1. The generator includes one channel for generating digital output signals having a relatively high fundamental frequency component. A second channel is also included for generating digital output signals having a relatively low fundamental frequency component. The high and low frequency channels are connected between a source of input data, shown as push button block 2 and means for combining the digital output signals, shown as output summing circuitry 3. The output signal from the summing circuitry 3 comprising one signal, is supplied to a transmission line 4 such as a telephone line or the like. The relative amplitudes of the digital signals being combined by summing circuitry 3 may vary as a function of a particular application.

For a telephone system application, the frequencies (fundamental components) of the relatively high and relatively low frequency digital output signals are listed in Table I below.

TABLE I

| |
|---|
| High Frequency Signals |
| 1219HZ |
| 1336HZ |
| 1477HZ |
| 1633HZ |
| Low Frequency Signals |
| 697HZ |
| 770HZ |
| 852HZ |
| 941HZ |

A set of push buttons shown at block 2 may comprise 10 switches, each indicating a specified input such as a number or symbol. In one embodiment, each of the push buttons controls a voltage level on two intersecting conductors of a suitable keyboard arrangement, such as a diode matrix (not shown). For example, when a push button is depressed, the intersecting conductors are connected to one voltage level such as electrical ground representing a false logic state. When none of the buttons are depressed, all of the conductors remain at a second voltage level such as −V, representing a true logic state.

Conductors of the keyboard arrangement (which may be included in push button block 2) are divided into two groups of four conductors each designated by the numerals 5 and 6. Individual conductors of group 5 are selectively connected to NAND gates implementing decode logic 7 for the high frequency channel. Similarly individual conductors of group 6 are selectively connected to NAND gates (not shown) implementing decode logic 8 for the low frequency channel.

Connections between the conductors and the NAND gates are made as a function of a digital count to be produced in the counters 9 and 10 during a counting cycle when a particular button is depressed. Counter 9, with five stages, has a counting cycle of 31 counts as shown by Table II below.

TABLE II

High Frequency Counter Cycle

| Counter Stages | Counts | Selected Frequencies |
|---|---|---|
| 12345 | | |
| 00000 | 14 | |
| 10000 | 13 | |
| 11000 | 12 | |
| 01100 | 11 | |
| 00110 | 10 | |
| 10011 | 9 | |
| 01001 | 8 | |
| 10100 | 7 | |
| 11010 | 6 | |

TABLE II-Continued

High Frequency Counter Cycle

| Counter Stages | Counts | Selected Frequencies |
|---|---|---|
| 01101 | 5 | |
| 10110 | 4 | |
| 11011 | 3 | |
| 11101 | 2 | |
| 11110 | 1 | [DETECTED COUNT RESET & SHIFT] |
| 01111 | 31 | 1219 Hz |
| 10111 | 30 | |
| 01011 | 29 | |
| 10101 | 28 | 1336 Hz |
| 01010 | 27 | |
| 00101 | 26 | |
| 00010 | 25 | 1477 Hz |
| 10001 | 24 | |
| 01000 | 23 | 1633 Hz |
| 00100 | 22 | |
| 10010 | 21 | |
| 11001 | 20 | |
| 11100 | 19 | |
| 01110 | 18 | |
| 00111 | 17 | |
| 00011 | 16 | |
| 00001 | 15 | |

Although not shown in a table, counter 10 with six stages has a counting cycle of 63 counts. However, as described below, the entire counting cycle is ordinarily not used. Also, in this application, the bit configuration of all ones is inhibited by both counters.

When no buttons are depressed, counter 9 sequentially assumes the bit configurations shown in Table II. The change from one bit configuration to a subsequent bit configuration is controlled by the feedback from stages 2 and 5 (starting on the left) of counter 9 through the NOT Exclusive OR gate 11, which is symbolized by the following logic function $(\overline{A \text{ O } B})$. The output from gate 11 is true when the output signals from both the second and fifth stages of counter 9 are either true or false. A true output from gate 11 sets the output of the first stage of counter 9 true for the next count. For example, as shown by count 3 in Table II, when the second and fifth stages are true for count 2, the first stage 1 is set true for count 6. Similarly, when the second and fifth stages are false, as shown by count 7, the first stage is set true. However, as shown by count 12, when the second and fifth stages are not simultaneously true or false, the first stage is set false for count 11. Thus, the first stage is set to the prescribed condition during the next clock pulse after the instantaneous clock condition has been detected.

Counters which are logically arranged to count in accordance with various sequences are often referred to as polynominal counters. Counters 9 and 10, using the NOT Exclusive OR gates to feedback the signals from stages two and five, illustrate one example of polynominal counters.

Each of the stages of the counters can be implemented by a NAND gate in combination with a logic inverter. The first stage of counter 9 illustrates one embodiment of a logic circuit which can be used. NAND gate 12 is connected in series with logic inverter 13. Inverter 13 inverts the output from 12 so that the outputs from the stage have the proper logic orientation relative to their input. NAND gate 12 receives an input from the logic gate 11 and from NAND gate 15 of decode logic 7. Normally (no input) all the outputs from the NAND gates of decode logic 7 are true and the decode logic does not exert control over the counting cycle.

When a button is depressed, the count in counter 9 is controlled by the outputs of the NAND gates comprising decode logic 7. One or more of the NAND gate outputs immediately becomes false. As a result, inputs to NAND gates, e.g., NAND gate 12, of certain stages is inhibited. The output from the affected stage is set false regardless of the input from a succeeding stage or from gate 11.

The counter is reset to a count corresponding to an input by the decode logic once each cycle when the outputs from the first through the fourth stages are true. When that occurs (11110), AND gate 16 becomes true for providing a count reset pulse on line 37 to the NAND gates of decode logic 7. Simultaneously, a shift pulse, identical to the reset pulse, is provided on line 18 into each stage of high frequency shift register 14.

The connections between selected conductors of group 5 and selected NAND gates of decode logic 7 can be determined by referring to Table II. As shown in the table for a particular embodiment and clock signal frequency, certain bit configurations correspond to certain high frequency signals. The relation is shown in Table III.

TABLE III

| Count | Frequency |
|---|---|
| 01111 | 1209 Hz |
| 10101 | 1336 Hz |
| 00010 | 1477 Hz |
| 01000 | 1633 Hz |

The output from one stage provides an input to a corresponding NAND gate of s subsequent stage so that the counter proceeds through its normal counting cycle until an input is received by depressing one of the push buttons illustrated by block 2.

A connection is made between a conductor and a NAND gate whenever a logic 1 appears in the bit configuration of the count. Therefore, for the count corresponding to 1209 Hz, a connection is made between the first conductor (1209) and each of the NAND gates of decode logic 7 excluding NAND gate 15. Similarly, the second conductor (1336) is connected to every other NAND gate in decode logic 7 beginning with NAND gate 15. The third conductor (1477) is connected to the fourth NAND gate and the fourth conductor (1633) and is connected only to the second NAND gate of decode logic 7.

Generally when a push button is depressed, the counter quickly counts to bit configuration 11110. A pulse is generated from AND gate 16 to reset the counter to another count as described above. For example, if a button is depressed and the fourth conductor (1633) is connected to electrical ground, the counter jumps from bit configuration 11110 to bit configuration 01000 when reset. As a result, the count cycle is shortened from 31 possible counts to 23 counts. Therefore, the frequency of the digital output signal represented by the shortened count is increased.

On the other hand, if a button is depressed and the first conductor is connected to electrical ground, the counter is reset to 01111 and each count of the counting cycle is utilized.

Figure 2:
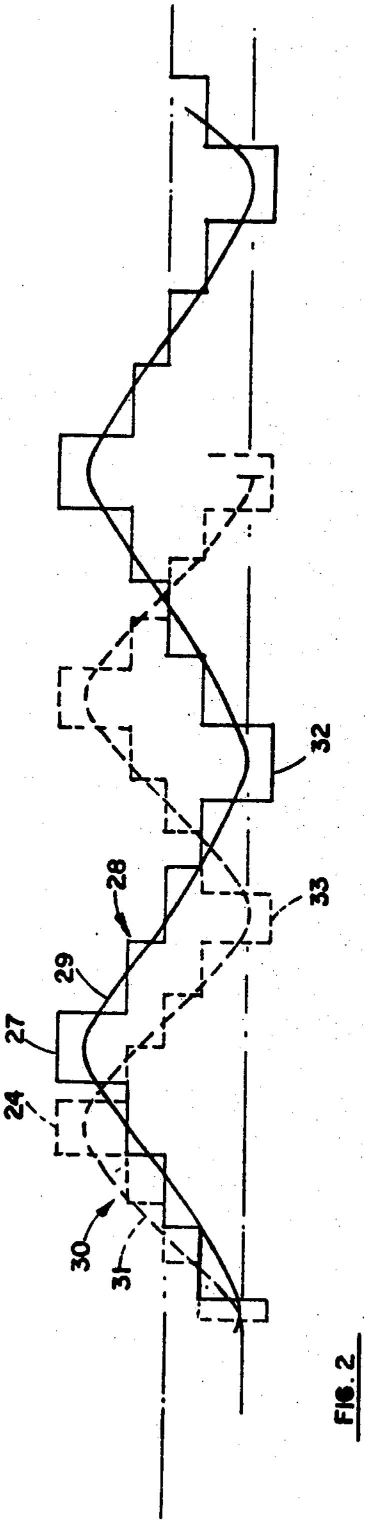
FIG. 2 is a signal diagram of digital signals representing two relatively high frequency output signals.

The relationship between the 1209 Hz and the 1633 Hz frequency signals can be seen by referring to FIG. 2. The shift in frequency due to the depression of a different button is clearly evident. Digital signal 30 illustrates a 1633 Hz signal and digital signal 28 illustrates a 1209 Hz signal. The sine wave equivalents 29 and 31 are also shown. FIG. 2 is described in more detail subsequently.

Decode logic 8, low frequency 10, NOT exclusive NOR logic gate 19 and AND gate 20 for the low frequency channel operate in a similar manner. When no push buttons are depressed, counter 10 has a counting cycle of 63. However, when a push button is depressed, and the 01111 count is detected, an output pulse is generated from AND gate 20 on reset line 21 into decode logic 8. Thereafter, the counter 10 is reset to a count as a function of the depressed button.

For convenience, the actual connections between the NAND gates (not shown) of decode logic 8 and the individual conductors identified generally by numeral 6 have been omitted. However, the counter 10 is reset to bit configurations corresponding to counts 52, 48, 44 and 40 of the counting cycles of counter 10. The counts indicated correspond to the frequencies of interest 697 Hz, 770 Hz, 852 Hz and 941 Hz for a telephone system application.

The pulse on line 21 (Reset) is also connected on line 22 to each stage of low frequency shift register 23 as a shift pulse.

For a particular application, the depression of button one connects the first conductors (1209) and (697) of each group to electrical ground. Button two connects the first conductor (1209) of group 5 and the second conductor (770) of group 6 to electrical ground. A complete set of relationships can be produced by applying the buttons to a conductor matrix.

Each of the shift registers 23 and 14 is implemented by four stages. The output from one stage is shifted into a subsequent stage with the output from the last stage inverted through logic inverters 25 and 26 into the first stages of the shift registers 23 and 14, respectively. The four stages of each shift register are interconnected and controlled so that a complete counting cycle comprises eight counts. The counting cycle for the shift registers is illustrated in the following Table IV.

TABLE IV

| Shift Register (High and Low) Counting Cycle Stages |
|---|
| 1234 |
| 0000 |
| 1000 |
| 1100 |
| 1110 |
| 1111 |
| 0111 |
| 0011 |
| 0001 |
| 0000 |

Shift registers logically connected as shown for registers 14 and 23 may be referred to as Johnson counters. Counting sequences other than the one specified above are inhibited as described subsequently.

As indicated above, for the count 1111, a maximum possible output occurs at nodes 44 and 53 from summing networks 34 and 35 respectively. The 1111 count is equivalent to the digital signal peak identified by numeral 27 in FIG. 2 for the digital output wave 28 or the peak 24 for the digital signal 30. The other peak of a digital output signal occurs at the count 0000. The lower peak is identified in FIG. 2 by the numeral 32 for the digital output signal 28 and by the numeral 33 for the digital output signal 30.

The stages of each of the shift registers may be implemented as shown in FIG. 1 by the first stage of shift register 14. The stage comprises AND gates 54 and 55 providing inputs to NOR gate 56. The output from NOR gate 56 is provided as an input to summing network 35 and to the control logic 57. In addition, the output from NOR gate 56 is inverted through the logic inverter 58 to provide an input to the second stage to the shift register. The output from the inverter 58 is also fedback to AND gate 55 for purposes described subsequently.

AND gate 54 receives a shift pulse from AND gate 16 and an inverted pulse from the last stage of the shift register through inverter 26. Therefore under normal operating conditions, when both inputs to AND gate 54 and corresponding AND gates of other stages are true, the output from logic inverter 58 is also true. Therefore as shown in Table IV for normal operations and corresponding logic inverters, the first stage is set true each time the last stage is false. Similarly, the first stage is set false each time the last stage is true.

Control logic 57 includes NAND gate 59 which receives inputs from stages one and three of counter 14. NOR gate 60 receives inputs from NAND gate 59 and stage two of counter 14. The output from NOR gate 60 as well as the output from dual input detection logic 61 and the output from AND gate 16 provide inputs to NOR gate 62. The output from NOR gate 62 is connected as one input to AND gate 55. The other input to AND gate 55 is fed back from the output of the same stage. As indicated by line 63, the control logic 57 provides an input to each AND gate of a stage corresponding to AND gate 55 for the first stage of counter 14.

The output from NOR gate 62 is true between shift pulses (from AND gate 16) and under normal conditions. It is false when a dual input is detected by dual input detection logic 61 and when certain inhibited states are detected by logic gates 59 and 60. Under those conditions, the output of a stage is recirculated through AND gate 55 of the same stage.

However, where two or more push buttons are depressed simultaneously, the output from the dual input detector 61 becomes true and the output from NOR gate 69 becomes true. As a result, AND gate 55 is inhibited and the output state is stored until only one button is depressed.

The dual input detection logic 61 is implemented by OR gates 65 and 66 receiving inputs from the first (1209) and second (1336), and third (1477) and fourth (1633) conductors of group 5 respectively. The outputs from the OR gates are connected as one of three inputs to AND gates 67 and 68. The other inputs are received from the third and fourth conductors and the first and second conductors respectively. Outputs from AND gates 67 and 68 are provided as inputs to NOR gate 69. When the signals on all of the conductors of group 5 are true, or when the signal on only one conductor is false, the output from NOR gate 69 is false. However, when the signals on two or more conductors are false simultaneously, the outputs from AND gates 67 or 68 become false to drive NOR gate 69 true. As indicated above, a true output from NOR gate 69 prevents a change in the logic state of the information in the shift register until the NOR gate becomes false.

NAND gate 59 and NOR gate 60 also control the output state of NOR gate 62 to prevent the occurrence of certain bit configurations in shift register 14. The only permitted counts (bit configurations) are the counts indicated in Table IV. For example, a bit configuration containing 010_ is prevented. For example, the shift register counts until the output from NOR gate 56 is true (the output from the stage is false) and similar outputs from stages two and three are false and true respectively. When that bit configuration is detected, the output from NAND gate 59 is false and the other input to NOR gate 60 from stage two of counter 14 whereupon NOR gate 60 is set true.

Under those circumstances, the output from NOR gate 62 becomes false so that the next input from AND gate 16 resets the shift register to all zeroes and the count proceed as shown in Table IV.

Dual input detection logic 70 and control logic 71 are provided for the low frequency channel. Circuitry shown for detector 61 and control logic 57 can be used to implement devices 70 and 71 respectively.

The outputs from each stage of shift registers 23 and 14 are connected through summing networks 34 and 35 respectively. Each of the networks comprises driver circuits and resistors for providing desired signal amplitude (voltage levels at nodes 44 and 53) corresponding to each shift register bit configuration (count).

Network 34 comprises drivers 36, 37, 38, and 39 for driving current from the corresponding shift register stages through resistors 40, 41, 42, and 43 to node 44 and into output summing circuit 3. The resistors have resistance relationships of 2R, R, R, and 2R as shown. Therefore, as the stages sequentially become true, the voltage level sequentially increases until a maximum output voltage level is reached as shown by digital output signals 28 and 30 in FIG. 2.

Summing network 35 similarly comprises drivers 45, 46, 47, and 48 for driving current through resistors 49, 50, 51 and 52 respectively to node 53 and into output summing circuit 3. The resistors have a relationship of 2R, R, R, and 2R as described in connection with network 34.

A driver may be implemented by two field effect transistors in series between a voltage level and electrical ground, and a clocked sampling field effect transistor between a stage and the gate electrode of one of the series transistors. Obviously, many circuits can be used as a driver circuit. The driver must provide an output in accordance with the logic stage of a stage for at least one clock cycle. During a subsequent clock cycle the state may be changed as indicated by Table IV.

The signals at nodes 53 and 44 are mixed, or combined, in summing circuit 3 to provide a composite signal at the transmission line 4. The signal at transmission line 4 is a combination of a relatively high and a relatively low frequency signal. When a driver of a network is a logic one (true), current is drawn through the resistive element to provide composite output signals at the output.

For a telephone application, the signal at the transmission line 4 is an audio signal, or tone, representing the number on the particular button depressed. The output tone, or signal, is different for each button. The tone is decoded at a remote location for connecting the calling telephone with the called telephone in accordance with the depressed push buttons.

Although not shown, the logic gates and circuitry shown in FIG. 1 can be implemented by field effect transistors in an integrated circuit. For example, high voltage P-channel devices can be used. In other embodiments N-channel, silicon gate, CMOS and other types of field effect transistors or bipolar devices can be used to implement the gates and circuitry.

In addition, logic gates are operated in accordance with a multiple phase clock cycle. Clock signals $\phi_1$, $\phi_{1+2}$, $\phi_3$ and $\phi_{3+4}$ are generated by clock generator 72. The symbol $\phi_1$, designates a clock signal having one true period each clock cycle. $\phi_{1+2}$ designates a clock signal having two consecutive true periods each clock cycle. $\phi_3$ and $\phi_{3+4}$ also have one and two true periods respectively. A clock cycle is comprised of four periods, $\phi_1$, $\phi_2$, $\phi_3$, and $\phi_4$. Gates clocked according to a four phase clock cycle are called four phase gates. One example of such gates are shown and described in U.S. Pat. No. 3,526,783, entitled Multiple Phase Gate Usable in Multiple Phase Gating Systems, issued Sept. 1, 1970, to Robert K. Booher.

It should be understood that the system shown in FIG. 1 is not limited to four phase gates. Four phase gates are used to describe one embodiment of the invention. Other gates known to persons skilled in the art include two phase, three phase, and four phase gates without the overlapping true periods described above.

Specific embodiments of NAND, NOR, OR, AND and $\overline{OR}$ gates are not shown since such embodiments are believed obvious and known to persons skilled in the art. NAND gates and NOR gate structures are shown in the referenced patent. The use of an additional inverter circuit comprising two or three clock transistors in combination with a NAND or NOR gate can be used to implement an AND or an OR gate.

The clock signals for generator 72 are electrically connected to each logic gate of the FIG. 1 system in a conventional manner. However, for convenience the connections are not shown in the figure.

The clock generator 72 is shown in block form. Various circuits can be used to implement a suitable clock generator including a crystal oscillator in combination with dividing circuitry and logic gates. For example, a crystal oscillator generating a signal having a frequency of 3.57MHZ can be used. Flip-flops connected in series can be used to divide the frequency to of the signal produced by generator 72, for example, 298.3KHZ. The flip-flop outputs can then be combined through logic gates to produce the desired clock signal relationship.

The clock signal frequency and the counting cycle of counters 9 and 10 control the cycle of the shift registers 23 and 24. In effect, the clock signal, using the above example, is divided by the counting cycle of counter 9 (31 max.) and shift register 14 (8) when no buttons are depressed. Similarly, the clock signal is divided by counter 10 (max. 63) and shift register 23 (8) when no buttons are depressed. When a button is depressed, the block frequency is divided by different numbers. A formula which can be used to calculate the frequency of the digital output signal is shown below:

$$f_o = f_c/(\text{Cnt}_1 \cdot \text{Cnt}_2), \quad (2)$$

where $f_o$ is the frequency of digital output signals at nodes 53 or 44, $\text{Cnt}_1$ is the count of counters 9 and 10 as a function of a depressed push button, $\text{Cnt}_2$ is the count of the shift registers 14 and 23, and $f_c$ is the frequency of the clock signal.

By using the formula above and 298.3KHZ as a clock signal, the digital output signal at node 44 can be calculated, assuming a count of 53 in counter 10.

$$f_o = 298.3/[(53) \times 8] = 703\text{Hz}$$

The fundamental frequency component of the digital output signals at the nodes 44 and 53 can be computed in a similar manner. The 703 Hz signal is within the prescribed tolerance limits (i.e. approximately 1.0 percent) of the established frequency of 697 Hz.

Briefly, the system operation begins with the depression of a push button. When a button is pushed, counters 9 and 10 cycle at a rate determined by the clock frequency. The counters recycle between their respectively detected counts (11110, 111110) and a reset count determined by the particular button depressed. Each time the counters become set to the detected count, a reset pulse is provided at the outputs of AND gates 16 and 20 for resetting the counters via decode logic 7 and 8 to a particular count equivalent to the depressed button. Simultaneously, the pulse, designated as a shift pulse, is connected to AND gates e.g., 54, at the inputs to each stage of the shift registers 14 and 23. The shift registers are then set to one of the counts indicated in Table III as a function of a previous count. Simultaneously, a voltage level equivalent to the shift register counts is provided through networks 34 and 35 at nodes 53 and 54. The voltage levels are combined in the output summing circuit and processed to the output 4.

As indicated above, the clock signal has a relatively high frequency. As a result, during the relatively short time period that a button is depressed, the counters recycle a sufficient number of times to enable the shift registers 14 and 23 to count through all the counts shown in Table III. The clock frequency must be selected to enable the counters 9 and 10 and therefore the shift registers 14 and 23 to pass through their respective counts a sufficient number of times to generate a proper tone on output 4 even when the button is held in a depressed condition a relatively short period.

Therefore, when a push button is depressed, the clock frequency gates the counters at a relatively fast rate so that the shift registers 14 and 23 pass through all the counts for generating digital output signals at nodes 53 and 44 resembling the digital output signals 28 and 30 in FIG. 2. It is pointed out however that the frequency of the signals shown in FIG. 2 represent two frequencies of the same group. In the usual case, the frequency at node 53 is relatively high frequency and the frequency at node 44 is a relatively low frequency. Because of the counting arrangement of the shift registers and because of the arrangement of the resistors 40–43, 49–52 of networks 34 and 35, the digital output signals have a relatively high fundamental frequency component at the desired output frequencies. The signals are combined through the summing circuit 3 to the output 4. Where the output is a telephone line, a certain amount of filtering is done by the line. In further applications, it may be desirable to provide a filtering network at the output to filter out the relatively higher harmonic frequency components.

I claim:

1. A digital signal generator comprising, digital counter means for cyclically generating pulses in response to an input signal, means for varying the period of the cycle of said digital counter means as a function of the input signal, and shift register means responsive to the pulses generated by said digital counter means for generating digital output signals having a fundamental frequency component representative of said input signal.

2. The digital signal generator recited in claim 1 including input means for supplying a plurality of input signals, each of said input signals exhibiting a different frequency.

3. The digital signal generator recited in claim 1 including summing means connected to said shift register means to receive the digital output signals generated thereby, and decoding means connected to receive said input signal for operation thereon and application to said counter means.

4. A digital signal generator comprising, first and second counter circuits for cyclically counting to first and second counts respectively in response to separate input signals, each of said first and second counter circuits including means for varying the period of the counting cycle as a function of said input signals, each of said counter circuits providing output pulses for each cycle upon achieving said first and second counts, first and second shift register circuits responsive to the output pulses from said first and second counter circuits respectively for being set to a prescribed bit configuration, each of said first and second shift register circuits providing an output voltage level from each stage thereof as a function of said bit configuration, and first and second voltage summing circuits for summing the output voltage level from each stage of said first and second shift register circuits for producing digital signals having fundamental frequency components representing each of said input signals.

5. The digital signal generator recited in claim 2 further including means for combining the digital signals from said first and second voltage summing circuits for producing one composite output signal representing both of said input signals.

6. The digital signal generator 4 wherein said first and second shift register circuits include means for inhibiting certain bit configurations for producing said digital signals with relatively high fundamental frequency components and relatively low harmonic frequency components.

7. The digital signal generator recited in claim 4 further including means for detecting more than one input signal, and means for inhibiting change in the bit configuration of said shift register circuits upon detection of more than one input signal by said means for detecting.

8. The digital signal generator recited in claim 4 wherein said first and second counter circuits each include control circuitry for enabling each counter to be reset to a predetermined logic state upon detection of said first and second counts.

9. The digital signal generator recited in claim 8 wherein one of said counters includes more stages than the other counter thereby providing said output pulses at different rates whereby relatively high and low frequency signals are generated at the output of said summing circuits.

10. The digital signal generator recited in claim 4 including means for supplying a plurality of input signals of different frequencies, decoding means connected to receive said input signals and to apply decoded signals to each of said first and second counter means.

* * * * *

PO-1050
(5/69)

UNITED STATES PATENT OFFICE
CERTIFICATE OF CORRECTION

Patent No. 3,820,028 Dated June 25, 1974

Inventor(s) James L. Thomas

It is certified that error appears in the above-identified patent and that said Letters Patent are hereby corrected as shown below:

Column 3, line 17, change "1219HZ" to --1209HZ--.

Column 4, line 11, change "1219HZ" to --1209HZ--,
line 36, change "$(\overline{A\ O\ B})$" to --$(\overline{A \oplus B})$--.

Column 5, line 15, change "37" to --17--,
line 38, change "of s" to --of a--.

Column 6, line 24, change "52" to --53--.

Column 8, line 16, after "14" insert --is false--.

Column 9, line 52, after "frequency" delete "to",
line 53, after "72" and before the comma "," insert --to--,
line 65, change "block" to --clock--.

Column 12, line 13, after "generator" insert --recited in claim--.

Signed and sealed this 7th day of January 1975.

(SEAL)
Attest:

McCOY M. GIBSON JR.
Attesting Officer

C. MARSHALL DANN
Commissioner of Patents